United States Patent [19]

Parslow, Jr.

[11] Patent Number: 4,732,589
[45] Date of Patent: Mar. 22, 1988

[54] FLOW REGULATING VALVE FOR USE IN AN AIR SCRUBBING DEVICE

[75] Inventor: Harold W. Parslow, Jr., Mt. Clemens, Mich.

[73] Assignee: GraPar Corporation, Warren, Mich.

[21] Appl. No.: 861,149

[22] Filed: May 8, 1986

[51] Int. Cl.⁴ .................................. B01D 47/00
[52] U.S. Cl. .......................... 55/227; 55/230; 55/241; 251/122; 251/216; 251/358
[58] Field of Search ............... 55/227, 230, 231, 240, 55/241; 251/122, 215, 216, 358, 903; 261/71

[56] References Cited

U.S. PATENT DOCUMENTS

| | | | |
|---|---|---|---|
| 1,038,817 | 9/1912 | Ashton | 251/122 X |
| 1,151,047 | 8/1915 | Robley | 251/215 X |
| 1,529,926 | 3/1925 | Scheelk | 251/215 |
| 1,929,973 | 10/1933 | Haley | 251/122 X |
| 2,822,789 | 2/1958 | Philips et al. | 251/122 X |
| 4,078,383 | 3/1978 | Nehrig | 251/122 X |
| 4,262,698 | 4/1981 | Fields | 251/358 X |
| 4,440,554 | 4/1984 | Perry | 55/241 |

Primary Examiner—Kathleen J. Prunner
Attorney, Agent, or Firm—Basile and Hanlon

[57] ABSTRACT

A water control valve in a wet air scrubbing device to discharge and direct water flow within the scrubber. The valve is composed of a conical valve body made of polyurethane and a fluid discharge receptor firmly attached to the air scrubbing device and connected to a water source. The conical valve body is movable into and out of engagement with the discharge repcetor. The conical valve body of the present invention is resistant to degradation by solvent vapor, resists contaminant adhesion and provides self-sealing engagement when the valve body is brought into contact with the discharge receptor.

4 Claims, 2 Drawing Figures

FLOW REGULATING VALVE FOR USE IN AIR SCRUBBING DEVICE

BACKGROUND OF THE INVENTION

1. Field of the Invention

This invention relates to devices which regulate the flow of a cleaning liquid for wet air scrubbing devices. More particularly, this invention relates to adjustable cone control valves used with wet air scrubbing devices; the valves regulate the water introduced into a contaminant laden air stream.

2. Summary of the Prior Art

Gas scrubbing devices are used extensively to remove particulate contaminants from air. These devices have become increasingly important with the advent of air pollution requirements and worker safety standards. One particular application for these devices is in relation to paint spray booths.

In paint spray booths, the device to be painted is exposed to a paint spray stream. The over-spray is removed by drawing the contaminated atmosphere into contact with a fluid stream such as a water stream. The particulate contaminants are admixed with the fluid stream and separated from the gaseous atmosphere. The fluid stream can then be filtered and recycled.

One such system is described in U.S. Pat. No. 4,440,554 to Perry. In the gas scrubbing system of Perry, the water is fed to the scrubbing device by a series of metal cone-control valves located periodically along the sides of the gas scrubbing device. The water introduced through these cone-control valves is fed over a weir to a central drain. At the drain, the contaminant-laden air is admixed with the water, effectively separating the contaminants from the air.

Due to the nature of the wet scrubber system, the cone-control valves must operate in an atmosphere which is laden with particulate contaminants and solvent vapors associated with paint-spraying operations. This environment can cause corrosion, obstruction and eventual failure of the cone-control valves.

In air scrubbing devices of this type, it is necessary that each cone-control valve function to uniformly direct the flow of water. Uniform water dispersal is imperative to the efficient function of the scrubber. This requires exacting machining and tooling operations to obtain the necessary tolerances with conventional metal valve cones, this is difficult and costly.

Even well machined valve cones can be obstructed as they become coated with paint overspray and the like. Minute amounts of paint present on the valve cone can destroy the even flow characteristics of the valve. As the valve becomes fouled, it will require removal from the gas scrubbing device and time-consuming cleaning operations. This can result in expensive down-time for the entire device and any associated assembly line.

Another major drawback of conventional metal valves in wet air scrubbing applications of this sort is the inability of these devices to provide a fluid tight seal where the valve cone engages the water outlet. To stop fluid flow through a particular valve, seals or gaskets must be used. These seals are commonly O-rings located on or in the water outlet and, are generally composed of a compressible rubber or other suitable polymeric material. Prolonged use and exposure to solvent-laden atmospheres can cause distortion, swelling, and decomposition of the seal.

Thus, it would be desirable to manufacture a cone flow-directing valve for use in a gas scrubbing device which would be impervious to the solvent and contaminant-laden atmosphere into which it is placed. It is also desirable that the valve be easily cleanable should it become clogged. It is also desirable that the conical valve member be capable of sealingly seating with a compatible member to constrict or stop the fluid flow as desired. Finally, it is desirable that the valve be capable of being manufactured to close tolerances to provide maximum fluid flow directing capability.

SUMMARY OF THE INVENTION

There is disclosed in the present invention, a cone-control valve assembly, which can be used in a conventional wet air scrubbing device to regulate and direct the flow of the water or other purifying fluid used in the device, which is resistant to corrosion and clogging. The cone-control valve of the present invention is comprised of a cylindrical discharge receptor and a conical valve body movable relative to the receptor. The cylindrical discharge receptor is anchored at an appropriate location in the scrubbing device. A first end of the cylindrical discharge receptor is connected to a fluid supply source. A second end opens in the scrubbing device to convey the fluid from the supply source to the scrubbing area. The conical valve body is adapted to be matingly received within the second end of the cylindrical discharge receptor. The conical valve body is constructed of polyurethane. The present invention also includes means for raising and lowering the conical valve body relative to the discharge receptor.

DESCRIPTION OF THE DRAWING

Further advantages and features of the invention are set forth in the following description with reference to the accompanying drawings in which like numbers are used to denote identical features throughout the several figures, and in which.

DESCRIPTION OF THE PREFERRED EMBODIMENT

Figure 2:
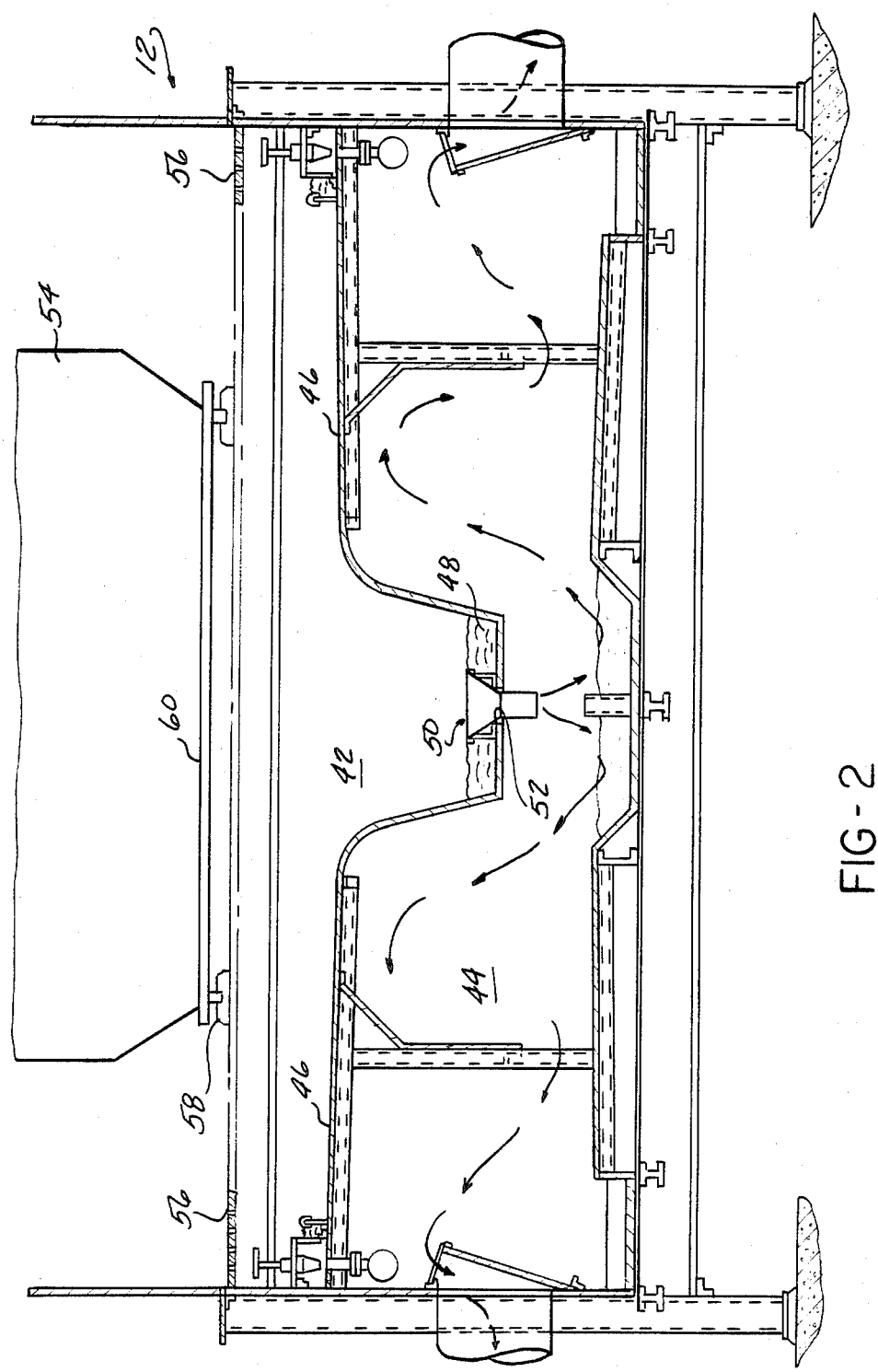
FIG. 2 shows a cross-section of a conventional spray chamber for spray painting work pieces such as automobile chassis or bodies with adjustable cone-control valves in position.

The adjustable cone-control valve 10 of the present invention is adapted to be secured in wet air gas scrubbing devices such as the scrubbing device 12 shown in FIG. 2. The scrubbing device 12 shown in FIG. 2 is set forth for illustrative purposes only.

As can readily be appreciated by those skilled in the art, such scrubbing devices include a first chamber 42 through which a gas stream passes and becomes entrained with particulate matter. A second chamber 44 is provided which is separated from the first chamber by an inclined flood sheet 46 which is formed with a trough 48 along the lowermost section thereof. The lowermost portion of the trough has an opening which can be equipped with contacting means 50 to permit intimate contact between the gas stream and liquid which flows down the inclined flood sheet, into the trough 48, through the contacting means 50, and is introduced into the second chamber 44. One such contacting means 50 is a venturi 52 removably disposed in the lowermost portion of the trough 48.

In scrubbers of this type, suitable blower means (not shown) may be provided to provide a pressure differential between the first chamber 42 and second chamber 44 to induce the flow of the gas or air stream from the first chamber 42 through the venturi 52, in a manner so as to effect an atomization of the liquid at the lip of the venturi throat assuring intimate washing contact and entrapment of the particulate matter in the gas stream by the liquid washing medium.

The second chamber 44, into which the atomized liquid and scrubbing gas stream is discharged, is provided with suitable means for removing liquid and gas. Conventional liquid and gaseous removal means which would be known to one reasonably skilled in the art may be employed.

Devices and objects 54 to be spray painted are positioned above the first chamber 42 on an open grate or mesh 56. Gravity and any pressure differential induced by the suitable blower means cause the gas stream and paint particles to pass through the grate or mesh 56 into the first chamber 42 to become mixed with the water stream. As can be appreciated by the skilled artisan, the object 54 can be moved along in assembly-line fashion by suitable rails 58 and supports 60 if so desired.

It is to be understood that the adjustable cone control valve 10 of the present invention can be suitably employed in various wet air scrubbing devices. The function of such devices is set forth in U.S. Pat. No. 4,345,921 to Gustavsson and U.S. Pat. No. 4,440,554 to Perry; the subject matter of which are both incorporated by reference herein.

Figure 1:
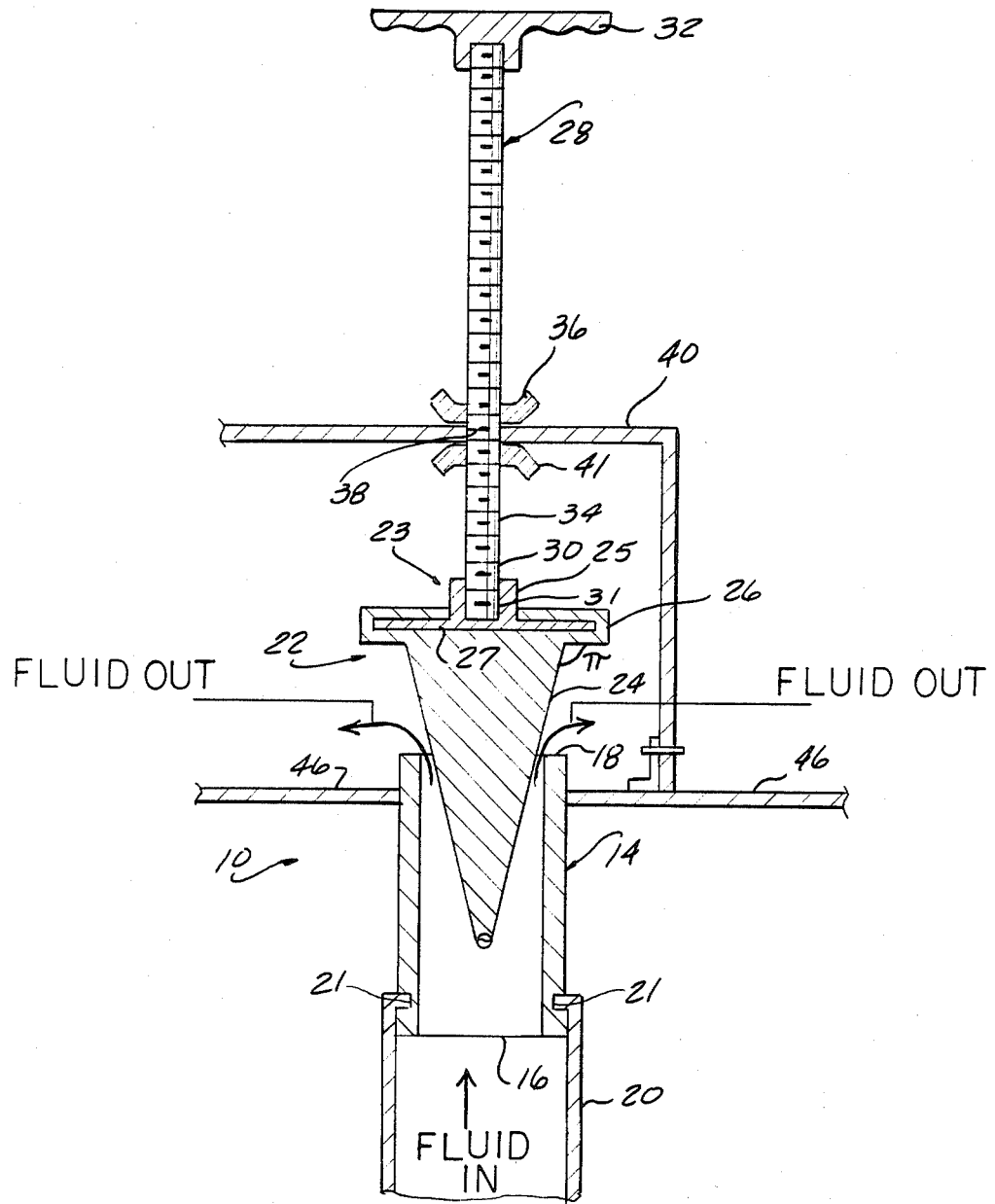
FIG. 1 shows a cross-section of the adjustable cone-control valve of the present invention.

As illustrated in FIG. 1, the adjustable control valve 10 of the present invention has a cylindrical discharge receptor 14 adapted to be mounted in a suitable location within the scrubbing device 12. The cylindrical discharge receptor 14 is a hollow, cylindrical tube having first and second openings at first and second ends 16 and 18, respectively. The first end 16 of the cylindrical discharge receptor 14 is adapted to be connected to a suitable fluid supply device 20. In the preferred embodiment, the discharge receptor 14 has an annular indentation 21 located on the outside face of the receptor adjacent to the first end 16. The annular indentation 21 is adapted to receive conventional pipe couplings (not shown).

When the device 10 is in position, the fluid is fed from the fluid supply device 20 through the cylindrical discharge receptor 14 to exit through the first opening located at the second end 18 of the cylindrical discharge receptor 14 for discharge in a desired pattern.

It is to be understood that the fluid employed can be any fluid or mixture of fluids suitable for purification procedures. The fluid generally used is water. However, other liquids may, potentially, be successfully employed in certain instances. It is also feasible to employ additives in the fluid chosen which can aid in eventual separation of entrained contaminants from the fluid after air scrubbing. The cylindrical discharge receptor 14 is constructed of suitable material which does not react with the fluid passing therethrough. In the preferred embodiment, the receptor 14 is constructed from a metal such as copper, steel or the like. The receptor can also be constructed in an arrangement in which the interior of the tube is lined with a non-reactive metal sleeve. The surrounding outer material can then be of any desired material.

The receptor 14 is adapted to be secured in the flooring or inclined flat sheet 46 of a suitable wet air scrubber such as the air scrubber 12 shown in FIG. 2. The receptor 14 can be secured by any suitable means such as welding or the like. In the preferred embodiment, the receptor 14 is welded to the flooring or inclined flat sheet 46. However, in certain instances, the receptor 14 can be constructed with an outwardly extending annular flange (not shown) located proximate to the second end 18. The flange can then be bolted or otherwise suitably attached to the flooring or inclined flat sheet 46.

The adjustable control valve 10 of the present invention also includes a conical valve body 22 movable relative to discharge receptor 14. The conical valve body 22 is adapted to extend into the cylindrical discharge receptor 14 between a sealed position in which the body 22 contacts the receptor 14 and an open position shown in FIG. 1.

The conical valve body is comprised of a conically tapered projection 24 and a disc-like ledge 26. The tapered projection 24 has a maximum diameter greater than or equal to that of the hollow central portion of the cylindrical discharge receptor 14. The disc-like ledge 26 preferably has a diameter greater than that of the conically tapered portion 24. The disc-like ledge 26 is located immediately adjacent to the maximum diametric portion of the conically tapered projection 24.

In the present invention, the conically tapered projection 24 has an apex angle $\theta$, which may vary between about 20° and 45°. Preferably, the apex angle $\theta$ varies between 30° and 40°. The axis of rotation of the conical tapered projection 24 is located directly parallel to the fluid flow. In this manner, water is directed along all sides of the conically tapered projection 24. It has been found that a conically tapered projection 24, having an apex angle between about 20° and about 45°, directs the discharged fluid flow toward the maximum coverage area.

The disc-like ledge 26 forms an obtuse angle $\pi$, which may vary between about 100° and 135°, with respect to the outer surface of the conically tapered projection 24. The disc-like ledge 26 diverts the upward flow of the discharged fluid and directs it radially outwardly away from the cone-control valve 10.

The control valve 10 of the present invention also includes means for moving the conical valve body 22 into and out of engagement with the receptor 14. Said movement means can be hand actuated or can include any type of conventional mechanically or electrically actuated closure devices. In the preferred embodiment, the movement means includes a yoke mount 28 which may be constructed of any suitable material such as steel or iron. The yoke mount 28 is adapted to be mounted or fastened to a suitable attachment projection 23 on the disc-like ledge 26.

The attachment projection 23 is preferably located on the center of the disc-like ledge 26, on a face opposed to the conically tapered projection 24. In the preferred embodiment, the attachment projection is a threaded metal nut 25 integrally attached to an outwardly extending metal support member 27. The threaded nut 25 and support member 27 are encased in the polymeric disk-like ledge 26 such that the attachment projection 23 extends outwardly therefrom. The support member 27 is, preferably, a metal disc having a diameter and height less than the disc-like member 26. In the preferred embodiment, the yoke mount 28 is composed of a shaft 30 having a lower threaded portion 31 adapted to be matingly received within the nut 25. The shaft 30 extends perpendicularly outwardly from the disc-like ledge 26 and terminates in a handle 32. The shaft 30 has a removable wing nut 36 and a central threaded portion 34 adapted to secure the conical valve body 22 in position relative to the receptor 14. The shaft 30 is adapted to extend through a central aperture 38 which is located in a suitable mounting bracket 40 which can be secured to the inclined floodsheet 46 of the wet air scrubber 12. The handle 32 and shaft 30 are adapted to insert or retract the conical valve body 22 in relation to the cylindrical discharge receptor 14. Movement of wing nut 36 up or down the central threaded portion 34 of shaft 30 will determine the position of the conical projection 24 relative to the receptor 14. The mounting bracket 40 may have any configuration suitable for securing the conical valve body 22 in relation to the cylindrical discharge receptor 14. Alternavely, the shaft 30 can be threaded directly into a matingly threaded aperture (not shown) to provide direct engagement between the mounting bracket 40 and the yoke mount 28.

In the control valve 10 of the preferred embodiment, the yoke mount 28 can be raised relative to the bracket 40 to permit threading removal of the conical valve body 22. This permits easy disassembly and cleaning or replacement of the valve body 22 as necessary.

In the preferred embodiment, the conical valve body 22 has sufficient mass to prevent its upward movement due to surges in water pressure. However, the yoke mount 28 may optionally be equipped with a second threaded wing nut 41 located on the shaft adapted to be positioned immediately below the aperture 38 to prevent upward movement of the conical member 22.

The conical valve body 22 and cylindrical discharge receptor 14 of the adjustable cone-control valve 10 are constructed of a suitable moldable polymeric material such as polyurethane. Suitable polyurethane is commercially available from Satterlund Supply Company of Warren, Mich. under the compound name Urethane 95A Compound Number MMI 1016. The material can be molded in order to produce suitably shaped cone-control valve parts.

The use of polyurethane as the material of construction for the conical valve body 22 and cylindrical discharge receptor 14 permit self-sealing when the conical valve body 22 is lowered into contact with the cylindrical discharge receptor 14. In this manner, the adjustable cone-control valve 10 of the present invention can be closed when water flow is not desired at a given location.

Furthermore, the use of polyurethane provides a solvent resistant surface which prevents pitting or distortion after extended use. The material provides dry surface lubricity which reduces paint adhesion and provides longer periods of better flow symmetry.

Having thus disclosed this invention, what is claimed is:

1. In a wet air scrubbing device for removing particulate contaminants from a gaseous medium by entraining the contaminants in a liquid stream, the wet air scrubbing device having a plurality of liquid entry ports, at least one gaseous entry opening, means for intimately contacting the introduced liquid with the gas and means for removing the gas and contaminant-laden liquid after said contact, the improvement comprising:

at least one adjustable control valve located at each liquid entry port, the control valve having a cylindrical discharge receptor firmly anchored in the air scrubbing device;
  a liquid supply device connected to the cylindrical discharge receptor at a first end, the cylindrical discharge receptor conveying the liquid to the wet scrubbing device;
  a conical valve body adapted to be matingly received within and releasably contact the cylindrical discharge receptor at a second end opposed to the liquid supply device, wherein the conical valve body comprises:
  (a) a conically tapered projection constructed of polyurethane having an angular apex between about 20° and about 45° and a maximum diameter at least equal to that of the cylindrical discharge receptor, the angular apex adapted to extend into the cylindrical discharge receptor; and
  (b) a disk-like ledge attached to the largest portion of the conically tapered projection, the disk-like ledge extending axially from the conically tapered projection; the disk-like ledge being formed of polyurethane;
  (c) an attachment projection contiguous to the disk-like ledge, the attachment projection located on a face of the disk-like ledge opposite the conically tapered projection; and
  means for movably inserting and retracting the conical valve body relative to the cylindrical discharge receptor, the inserting and retracting means being attached to the attachment projection.

2. The adjustable control valve of claim 1 wherein the cylindrical discharge receptor has a hollow cylindrical center, the hollow cylindrical center extending from a first end immediately adjacent to the liquid supply device and a second end into which the conical valve body projects.

3. The adjustable control valve of claim 1 wherein the means for movably inserting and retracting the conical valve body comprises:

a mounting bracket attached to the wet air scrubbing device, the mounting bracket having an aperture located therein;
  a yoke mount projecting perpendicularly from the conical valve body adapted to be releasably attached thereto, the yoke mount comprising:
  (a) a threaded shaft attached to the conical valve body adapted to extend through the aperture; and
  (b) a first wing nut threadingly attached to the shaft and located thereon such that the mounting bracket is positioned between the wing nut and the conical valve body.

4. The adjustable control valve of claim 3 wherein the yoke mount further comprises a second wing nut threadingly attached to the shaft and located thereon such that the mounting bracket is positioned between the first wing nut and the second wing nut.

* * * * *